United States Patent [19]
Baum et al.

[11] Patent Number: 5,351,549
[45] Date of Patent: Oct. 4, 1994

[54] PULSED PRESSURE SENSOR CIRCUIT AND METHOD THEREFOR

[75] Inventors: Jeffrey Baum, Scottsdale; Warren J. Schultz, Tempe, both of Ariz.

[73] Assignee: Motorola, Inc., Schaumburg, Ill.

[21] Appl. No.: 954,996

[22] Filed: Oct. 1, 1992

[51] Int. Cl.$^5$ .......................... G01L 9/00; G01L 9/04
[52] U.S. Cl. ........................................ 73/723; 73/726
[58] Field of Search ................. 73/708, 720, 721, 723, 73/726, 727, 754; 338/4; 364/558

[56] References Cited

U.S. PATENT DOCUMENTS

| | | | |
|---|---|---|---|
| 3,908,460 | 9/1975 | Lichowsky | 73/723 |
| 4,250,759 | 2/1981 | Vago et al. | 73/723 |
| 4,321,832 | 3/1982 | Runyan | 364/558 |
| 4,362,060 | 12/1982 | Okayama et al. | 73/708 |
| 4,680,970 | 7/1987 | Ueda et al. | 73/723 |
| 4,798,093 | 1/1989 | Kenoun | 73/726 |
| 4,958,520 | 9/1990 | Trommler et al. | 73/727 |

Primary Examiner—Richard E. Chilcot, Jr.
Assistant Examiner—William L. Oen
Attorney, Agent, or Firm—Michael D. Bingham; Gary W. Hoshizaki

[57] ABSTRACT

A pulsed pressure sensor circuit (11) with increased sensitivity for measuring low pressures. A pulse generation circuit (12) is enabled by a microprocessor (28) to output a voltage pulse. The voltage pulse biases a pressure sensor (17) which has a port exposed to a pressure to be sensed. The pressure sensor (17) outputs a differential voltage which is proportional to the pressure at the port. The differential voltage is amplified by an amplifier (23) which has an output coupled to the microprocessor (28). A voltage divider circuit (26) is coupled to the pulse generation circuit (12) and has an output coupled to the microprocessor (28). The microprocessor (28) samples the voltages at the output of the amplifier (23) and the output of the voltage divider circuit (26). Microprocessor (28) then calculates the pressure using the sampled voltages and data stored in memory.

17 Claims, 1 Drawing Sheet

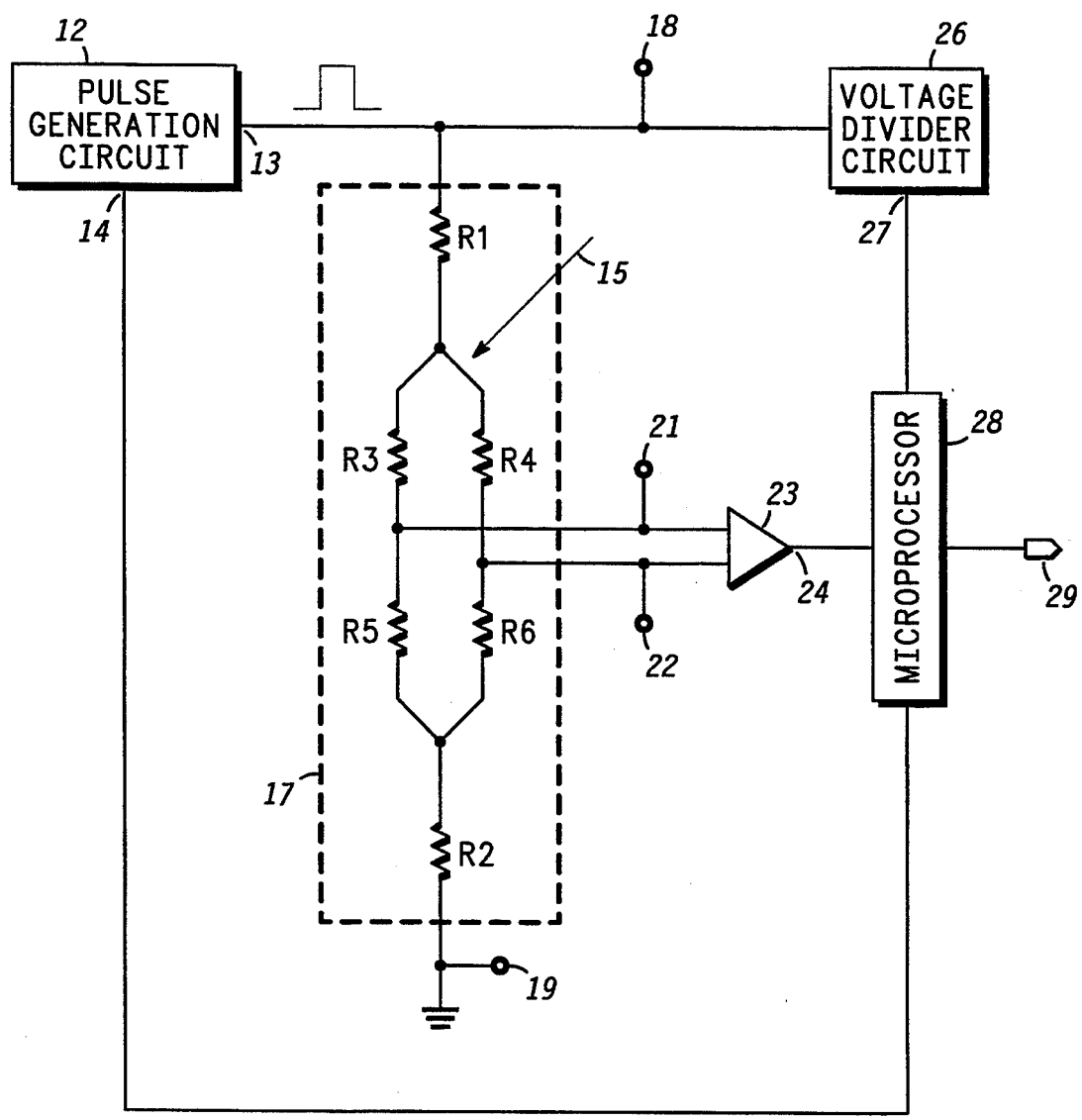

PULSED PRESSURE SENSOR CIRCUIT AND METHOD THEREFOR

BACKGROUND OF THE INVENTION

This invention relates, in general, to pressure sensing circuits, and more particularly to pressure sensing circuits for measuring low pressures.

A common semiconductor pressure sensor, such as the MPX2010 sensor manufactured by Motorola Inc., uses a resistor bridge to generate a differential voltage. The pressure sensor is biased with a D.C. voltage. The magnitude of the voltage determines the sensitivity and range of the pressure sensor. A port on the pressure sensor exposes a diaphragm which modifies resistance values in the resistor bridge when a pressure is applied. The pressure sensor outputs a differential voltage which is proportional to the pressure at the port.

Measuring low pressures accurately can be a problem since the magnitude of the pressure sensor differential voltage output is reduced at the lower pressures. This is compounded by the fact that small pressure differences will produce minute incremental voltage changes at the pressure sensor outputs which may be extremely difficult or impossible to resolve. There are pressure sensing circuits which attempt to overcome these problems but yield mixed results.

One technique commonly used is to amplify the differential output to a level where it can be easily measured or manipulated. A high gain amplification stage (gain greater than 500) must be used for low pressure applications. An amplifier used in a high gain configuration may have stability problems or nonlinearities which affect accuracy. Poor signal to noise ratios may result due to the small signal levels.

A second technique which produces better results is to bias the pressure sensor at a higher D.C. voltage. The higher bias voltage will increase the differential output voltage at a given pressure, thus incremental pressure changes will also result in larger voltage changes from the pressure sensor. A lower gain amplification stage can be used resulting in a higher signal to noise ratio and a more stable system. The drawback to this approach is that the bias voltage on the pressure sensor can only be increased so much. Power dissipation and other reliability/accuracy factors must be taken into account at the higher bias voltages.

It would be of great benefit if a pressure sensing circuit or method therefor could be developed which further increases sensitivity to allow accurate measurement of even lower pressures.

SUMMARY OF THE INVENTION

Briefly stated, this invention comprises a circuit and method for measuring pressure. A pulse generation circuit outputs a voltage pulse to bias a pressure sensor. The pressure sensor has a port exposed to a pressure to be measured. Once biased, the pressure sensor outputs a voltage proportional to the pressure at the port of the pressure sensor. An amplifier amplifies an output from the pressure sensor.

The method for measuring pressure comprises exposing the port of the pressure sensor to a pressure to be measured, biasing the pressure sensor with a voltage pulse, and measuring a voltage at an output of the pressure sensor. The voltage at the output of the pressure sensor is proportional to the pressure at the port.

BRIEF DESCRIPTION OF THE DRAWINGS

A single FIGURE is a block diagram of the preferred embodiment of a pulsed pressure sensing circuit in accordance with the present invention.

DETAILED DESCRIPTION OF THE DRAWINGS

The single FIGURE is a block diagram of the preferred embodiment of a pulsed pressure sensor circuit in accordance with the present invention.

A pulsed pressure sensor circuit 11 is illustrated in the single figure which is simple, cost effective, and increases sensitivity for measuring low pressures. A large portion of the pressure sensing market place is for pressure sensor circuits which measure pressures below 10,000 pascals. An integral part of any pressure sensor circuit is a pressure sensor such as the aforementioned MPX2010. The pressure sensor receives a pressure to be sensed and outputs a voltage which is proportional to that pressure. A semiconductor pressure sensor is a very economical pressure sensor but is not typically used for measuring low pressures. Although cost effective, a silicon diaphragm is stiff and does not bend easily at low pressures (less than 10,000 pascals), thus it's use has not been fully exploited in the low pressure sensor circuit market place. In the preferred embodiment, pulsed pressure sensor circuit 11 uses a semiconductor pressure sensor that produces a useable output voltage for pressures below 10,000 pascals. Pulse pressure sensor circuit 11 is not limited to low pressure measurements and can also be used for measuring pressures greater than 10,000 pascals.

A pulse generation circuit 12 has a control input 14 and an output 13. Pulse generation circuit 12 outputs a high voltage pulse of a predetermined magnitude and duration. Control input 14 is used to enable pulse generation circuit 12 to output a voltage pulse. Pulse generation circuit 12 could be designed with a programmable feature to vary the voltage pulse magnitude and duration for different applications but in this embodiment cost is a high priority, thus, pulse generation circuit 12 outputs a voltage pulse of fixed magnitude and duration responsive to an enabling signal supplied at input 14.

Pressure sensor 17 is indicated by a dashed line which surrounds sensor 17. Pressure sensor 17 has a first bias input 18, a second bias input 19, a first output 21, a second output 22, and a port exposed to a pressure to be measured as is generally well known. In the preferred embodiment, pressure sensor 17 is a semiconductor pressure sensor comprised of resistors R1–R6. Those skilled in the art will appreciate that resistors R1 and R2 are temperature compensation resistors and resistors R3, R4, R5, and R6 form a resistor bridge. The port (not illustrated) is indicated by arrow 15 and exposes a diaphragm to a pressure. A pressure on the diaphragm modifies resistance values of the resistor bridge.

First input 18 is coupled to output 13 of pulse generation circuit 12. Second output 19 is typically coupled to ground. A voltage pulse from pulse generation circuit 12 biases pressure sensor 17. The voltage at outputs 21 and 22 will be equal when R3=R4 and R5=R6 in the resistor bridge. A pressure at the port changes the resistance values of the resistor bridge which creates a differential voltage across outputs 21 and 22 as is known. The amount of differential voltage change per unit pressure change is known as pressure sensor sensitivity. The sensitivity of pressure sensor 17 generally increases with increasing voltage across first and second bias inputs 18 and 19. For example, a ten volt bias voltage across pressure sensor 17 will yield a greater voltage change across outputs 21 and 22 than a five vole bias voltage for a similar pressure change. The advantage of a larger differential voltage change per unit pressure change is a reduced susceptibility to noise problems and an increased resolution in accurately measuring low pressures.

A differential to single-ended output amplifier 23 is used to amplify the differential voltage across outputs 21 and 22 of pressure sensor 17 to provide a single-ended output voltage. Amplifier 23 has a first input coupled to output 21 of pressure sensor 17, a second input coupled to output 22 of pressure sensor 17, and an output 24. Amplifier 23 is set to a predetermined gain which is determined for a specific application. Factors which impact amplifier gain are the voltage pulse magnitude, signal level output from pressure sensor 17, and the type of circuitry receiving an output signal from amplifier 23. In the preferred embodiment, amplifier 23 is not set to an extremely large gain (typically less than 150), is low noise and has a fast settling time to minimize delay for output 24 to settle (or stabilize) in response to a pressure measurement.

A voltage divider 26 is used to produce a voltage proportional to the voltage pulse from pulse generation circuit 12. In the preferred embodiment, voltage divider circuit 26 is a resistor divider comprising two series resistors. Voltage divider 26 has an input coupled to output 13 of pulse generation circuit 12 and an output 27 which is taken at the interconnection of the two series resistors, for example. The magnitude of the voltage pulse from pulse generation circuit 12 can be computed by measuring a voltage at output 27 and multiplying the measured voltage by a predetermined constant.

In the preferred embodiment, a microprocessor (MPU) 28, for instance a MC68HC05 microprocessor manufactured by Motorola Inc., serves as a means for calculating the relative pressure applied to sensor 17. Microprocessor 28 has an output coupled to control input 14 for enabling pulse generation circuit 12, an input coupled to output 24 of operational amplifier 23, an input coupled to output 27 of voltage divider circuit 26, and an output 29. Operational amplifier 23 and voltage divider circuit 26 each output an analog signal which is used to calculate pressure by microprocessor 28. The inputs of microprocessor 28 coupled to output 24 and output 27 each couple to an analog to digital converter input of MPU 28 which then converts each analog signal to a digital format. A channel or multiplexer is enabled within microprocessor 28 coupling the input to the analog to digital converter (within MPU 28). Microprocessor 28 calculates the pressure sensed by pressure sensor 19 from the inputs it receives and outputs a corresponding pressure indication (in digital format) at output 29.

The method of operation of pulsed pressure sensing circuit 11 is best illustrated by describing a sequence of events when measuring a pressure. It is important to note that using a voltage pulse to bias pressure sensor 17 allows a much greater voltage magnitude to be used (due to lower power dissipation) thus increasing pressure sensor sensitivity over the same pressure sensor biased at a lower D.C. bias potential. The voltage pulse can be characterized by it's magnitude and duration. The magnitude of the voltage pulse is empirically determined for a pressure sensor and is based on long term reliability and pressure sensor accuracy. Preliminary data has shown that voltage magnitude can be increased approximately four times over the recommended D.C. pressure sensor bias voltage. For example, a pressure sensor D.C. biased at 10 volts can now be pulsed at 40 volts for a fourfold increase in sensitivity.

A minimum duration for a voltage pulse can be determined by a minimum time needed to make an accurate/stable measurement. Two events must occur during this minimum time. First, pressure sensor 17 is biased and outputs a differential voltage at outputs 21 and 22 that is proportional to an ambient pressure at the port indicated by arrow 15. Second, amplifier 23 amplifies the differential voltage and output 24 must be at a stable voltage (amplifier settling time) for microprocessor 28 to sample. The maximum duration of the voltage pulse and its duty cycle in conjunction with the voltage magnitude must not sufficiently heat resistors R1–R6 to distort the measurement.

In a normal environment pressure changes occur at a relatively slow pace. Pressure measurements are generally taken at intervals of a millisecond or longer. A typical pulse duration for pulsed pressure sensing circuit 11 is 200 microseconds. This would indicate that most time between pressure measurements is dead time or time when pressure sensor 17 is idle. For this case, biasing pressure sensor 17 with a voltage pulse not only increases sensitivity of the pressure sensor but also reduces power dissipation as no power is dissipated between voltage pulses.

A pressure sensing sequence begins with microprocessor 28 enabling pulse generation circuit 12. Output 13 of pulse generation circuit 12 outputs a voltage pulse which biases pressure sensor 17 and voltage divider 26. Pressure sensor 17 responds to a pressure at the port (indicated by arrow 15) generating a differential voltage across outputs 21 and 22. Amplifier 23 amplifies the differential voltage to provide a single-ended output voltage at output 24 which is received by microprocessor 28. Output 24 of amplifier 23 must stabilize to a voltage before microprocessor 28 samples the voltage at output 24. A predetermined time after pulse generation circuit 12 is enabled, microprocessor 28 will sample the voltage at output 24 of amplifier 23 and output 27 of voltage divider circuit 26. The predetermined time is chosen to insure that output 24 has stabilized to a voltage corresponding to the pressure at the port. Microprocessor 28 stores the voltage magnitude at output 24 and the voltage magnitude at output 27 in memory after converting to a digital format.

Voltage divider 26 is needed in this embodiment because the voltage magnitude of the voltage pulse is too large for the internal analog to digital converter in microprocessor 28. Voltage divider 26 outputs a reduced voltage which is proportional to the magnitude of the voltage pulse and can be converted to digital format by the analog to digital converter (in microprocessor 28). The voltage magnitude of the voltage pulse can be obtained by simply multiplying the reduced voltage by a constant. Microprocessor 28, by sampling output 27 simultaneously with output 24, allows a lower tolerance on voltage magnitude generated by pulse generation circuit 12 since the exact voltage is known (when sampled). The lower tolerance translates to reduced costs in building pulse generation circuit 12. An extremely accurate and stable voltage magnitude from pulse generation circuit 12 would render voltage divider circuit 26 unnecessary since the magnitude of a voltage pulse is known and could be stored in memory of microprocessor 28.

An alternative to pulsing pressure sensor circuit 11 with a fixed magnitude voltage pulse is a dynamic pressure sensor circuit in which the voltage pulse magnitude is variable. Changing the voltage pulse magnitude changes the pressure range which can be sensed by the dynamic pressure sensor circuit. As mentioned previously, using a high magnitude voltage pulse increases pressure sensor 17 sensitivity but reduces the range of pressure which can be measured. Likewise, reducing the magnitude of a voltage pulse decreases pressure sensor 17 sensitivity while increasing the range of pressure which can be measured. Pulse generation circuit 12 and microprocessor 28 would be used in combination to control and output a voltage pulse of appropriate magnitude for a pressure sensing application. An example which illustrates the benefits of a dynamic pressure sensor circuit is an aircraft which needs precise pressure measurements at all altitudes. As the aircraft travels from sea level to tens of thousands of feet it will experience significant changes in atmospheric pressure which cannot be measured accurately at all altitudes with a fixed sensor sensitivity. A dynamic pulsed pressure sensor would allow the pressure range to be adjusted to optimize sensitivity of pressure sensor 17 for a specific pressure measurement.

In the preferred embodiment, pulsed pressure sensor circuit 11 is calibrated at the factory. For example, at zero pressure (or minimum pressure ($P_{min}$)) pulsed pressure sensor circuit 11 is adjusted to output a voltage of 0.5 volts at output 24 of amplifier 23. The zero pressure calibration voltage at output 24 is known as $V_{off}$ (offset). Similarly, at maximum pressure ($P_{max}$) the pulsed pressure sensor circuit 11 is adjusted to output 4.5 volts. The maximum pressure calibration voltage at output 24 is known as $V_{fs}$ (full-scale). A voltage magnitude is measured at output 27 of voltage divider circuit 26 when $V_{off}$ and $V_{fs}$ is calibrated which is known as $B_{cal}$. A few constants are generated from these calibration values. The constants are stored in microprocessor 28 and used to calculate pressure. Listed below are the constants used to calculate pressure.

1) $V_{fs} - V_{off}$ is defined as a "voltage span" for a pressure measurement.
2) $(V_{fs} - V_{off})/B_{cal}$ is defined as a "normalized voltage span".
3) $(P_{max} * B_{cal})/(V_{fs} - V_{off})$ is defined as $S_n$ (normalized sensor sensitivity).
4) $V_{off}/B_{cal}$ is defined as $V_{offn}$ (normalized).

Sensor sensitivity $S_n$ and the normalized minimum pressure voltage $V_{offn}$ are stored in microprocessor 28 and used to calculate pressure. Outputs 24 and 27 are sampled by microprocessor 28 during a pressure measurement. The voltage magnitude sampled from output 24 of amplifier 23 is known as $V_{out}$. The voltage magnitude sampled from voltage divider circuit 26 is known as $V_{div}$. Pressure is calculated by microprocessor 28 and output in digital format at output 29 by the following equation.

5) Pressure $= [V_{out} - (V_{offn} * V_{div})] * [S_n * V_{div}]$

Pulsed pressure sensor circuit 11 may drift from the calibration voltages set at the factory over time. The drift or change in voltage will decrease accuracy of the measurement. A simple method for eliminating this error is possible due to the linear relationship between bias voltage and sensitivity of pressure sensor 17. The voltage drift does not affect the slope of the linear relationship between bias voltage and sensitivity. For example, the initial calibration for pulsed pressure sensor circuit 11, at zero pressure (or minimum pressure), is set at 0.50 volts, if a recalibration measurement at zero pressure (or minimum pressure) yields a voltage at output 24 (measured by microprocessor 28) of 0.55 volts, pulsed pressure sensor circuit 11 has drifted from it's original setting by 0.05 volts. Output 27 of voltage divider circuit 26 must also be measured with the recalibration measurement. The voltage drift can be cancelled by simply replacing $V_{off}$ and $B_{cal}$ in the equations listed above with the new measured values. Recalibration for drift insures maximum accuracy for pulsed pressure sensor circuit 11.

By now it should be appreciated that there has been provided a pulsed pressure sensor circuit for sensing pressure. Pulsed pressure sensor circuit 11 increases sensitivity for low pressure measurements while maintaining low cost and low power consumption.

We claim:

1. A pulsed pressure sensor circuit having increased sensitivity comprising:
   a pressure sensor having a bias input, a port and an output, said pressure sensor for providing an output voltage corresponding to a pressure at said port when a bias voltage is applied to said bias input; and
   a pulse generation circuit for providing a voltage pulse to said bias input of said pressure sensor, said voltage pulse biasing said pressure sensor for generating said output voltage.

2. The pulsed pressure sensor circuit of claim 1 wherein said pulse generation circuit has a control input responsive to an enabling signal applied thereto for providing said voltage pulse and wherein said pulse generation circuit provides a voltage pulse having a magnitude that exceeds a maximum DC bias voltage of said pressure sensor for increasing the sensitivity of the pulsed pressure sensor circuit.

3. The pulsed pressure sensor circuit of claim 2 further including:
   an amplifier having an input coupled to said output of said pressure sensor and an output; and
   a voltage divider circuit having an input coupled to said output of said pulse generation circuit and an output.

4. The pulsed pressure sensor circuit of claim 3 further including:
   a microprocessor having a first input coupled to said output of said amplifier, a second input coupled to said output of said voltage divider circuit, a first output coupled to said control input of said pulse generation circuit, and a second output for providing a signal corresponding to a pressure sensed by said pressure sensor.

5. The pulsed pressure sensor circuit of claim 1 wherein said pulse generation circuit is responsive to said enabling signal from said microprocessor for varying the magnitude of said voltage pulse to change sensitivity of said pressure sensor.

6. A method for sensing pressure comprising:
   exposing a port of a pressure sensor to a pressure;
   biasing said pressure sensor with a voltage pulse; and
   measuring an output voltage of said pressure sensor.

7. The method of claim 6 wherein said step of biasing said pressure sensor includes:

adjusting sensitivity of said pressure sensor by changing the voltage magnitude of said voltage pulse.

8. The method of claim 6 wherein said step of measuring an output voltage includes:
   amplifying said output voltage of said pressure sensor;
   sampling said amplified output voltage at a predetermined time; and
   converting said voltage to a digital format.

9. The method of claim 8 further including:
   sensing said voltage pulse;
   reducing the magnitude of said voltage pulse;
   sampling said reduced magnitude voltage pulse at a predetermined time; and
   converting said sampled voltage pulse to a digital format.

10. A pulsed pressure sensing circuit comprising:
    a pressure sensor having a bias input, a first output, a second output, and a port, said pressure sensor for providing an output voltage corresponding to a pressure at said port when a bias voltage is applied to said bias input;
    a pulse generation circuit for providing a voltage pulse to said bias input of said pressure sensor, said voltage pulse biasing said pressure sensor for generating said output voltage wherein sensitivity of said pressure sensor is increased by increasing a magnitude of said voltage pulse and average power dissipated by said pressure sensor is reduced by said voltage pulse;
    an amplifier for amplifying said output voltage of said pressure sensor having a first input and a second input coupled respectively to said first and second outputs of said pressure sensor and an output;
    a voltage divider circuit having an input coupled to said output of said pulse generation circuit, and an output; and
    means for calculating pressure having a first input coupled to said output of said amplifier, a second input coupled to said output of said voltage divider, a first output, and a second output coupled to said control input.

11. The pulsed pressure sensing circuit of claim 10 wherein said sensitivity of said pressure sensor increases as a magnitude of a voltage pulse of said pulse generation circuit is increased.

12. The pulsed pressure sensing circuit of claim 10 wherein said voltage divider circuit is a series connected resistor divider.

13. The pulsed pressure sensing circuit of claim 10 wherein said means for calculating pressure is a microprocessor.

14. The pulsed pressure sensing circuit of claim 13 wherein said microprocessor enables said pulse generation circuit to output a voltage pulse of a predetermined magnitude and duration and wherein said microprocessor samples said output of said amplifier and said output of said voltage divider circuit within said duration of said voltage pulse.

15. The pulsed pressure sensing circuit of claim 10 wherein said pressure sensor is a semiconductor pressure sensor.

16. A method as recited in claim 6 wherein said step of biasing said pressure sensor with a voltage pulse includes increasing a magnitude of said voltage pulse to increase sensitivity of said pressure sensor.

17. A method as recited in claim 6 wherein said step of biasing said pressure sensor with a voltage pulse includes reducing duty cycle of said voltage pulse to reduce average power dissipated by said pressure sensor.

* * * * *